(12) United States Patent
Shinoda et al.

(10) Patent No.: US 11,424,503 B2
(45) Date of Patent: Aug. 23, 2022

(54) VEHICLE BATTERY UNIT

(71) Applicant: HONDA MOTOR CO., LTD., Tokyo (JP)

(72) Inventors: Ryo Shinoda, Saitama (JP); Eiji Koike, Saitama (JP); Yosuke Yamagishi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 16/871,484

(22) Filed: May 11, 2020

(65) Prior Publication Data

US 2020/0365850 A1    Nov. 19, 2020

(30) Foreign Application Priority Data

May 16, 2019    (JP) .............................. JP2019-093130

(51) Int. Cl.
*H01M 50/20*     (2021.01)
*H01M 10/613*    (2014.01)
*H01M 10/6568*   (2014.01)
*H01M 10/625*    (2014.01)
*B60L 58/26*     (2019.01)
*B60L 50/64*     (2019.01)
*H01M 10/6556*   (2014.01)

(52) U.S. Cl.
CPC ............ *H01M 50/20* (2021.01); *B60L 50/64* (2019.02); *B60L 58/26* (2019.02); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC ........ B60L 3/0069; B60L 50/64; B60L 50/66; B60L 58/26; B60L 58/33; H01M 10/48; H01M 10/613; H01M 10/625; H01M 10/6556; H01M 10/6567; H01M 10/6568; H01M 2220/20; H01M 50/20
See application file for complete search history.

(56) References Cited

U.S. PATENT DOCUMENTS

| 2008/0190679 A1 | 8/2008 | Sato et al. |
| 2012/0121959 A1 | 5/2012 | Yamada |
| 2012/0312614 A1 | 12/2012 | Fujiwara et al. |
| 2018/0050607 A1* | 2/2018 | Matecki ................ H01M 50/20 |

FOREIGN PATENT DOCUMENTS

| CN | 104157805 A | 11/2014 |
| CN | 109546029 A | 3/2019 |
| CN | 208722945 U | 4/2019 |
| GB | 2460946 A | 12/2009 |

(Continued)

*Primary Examiner* — Adam A Arciero
(74) *Attorney, Agent, or Firm* — Paratus Law Group, PLLC

(57) ABSTRACT

A vehicle battery unit includes: a battery module; and a battery case configured to accommodate the battery module. The battery case includes: a case body; and a cover configured to seal an upper opening of the case body, the case body is provided with a front-rear reinforcement member disposed in a bottom portion of the case body and extending in a front-rear direction of a vehicle, and the front-rear reinforcement member includes a first battery support portion which supports the battery module.

9 Claims, 12 Drawing Sheets

(56) References Cited

FOREIGN PATENT DOCUMENTS

| | | |
|---|---|---|
| JP | 2008-183947 A | 8/2008 |
| JP | 4713615 B2 | 6/2011 |
| JP | 2012-109077 A | 6/2012 |
| JP | 2014-022157 A | 2/2014 |
| JP | 5513445 B2 | 6/2014 |
| JP | 2016-103491 A | 6/2016 |
| JP | 6016080 B2 | 10/2016 |
| JP | 6115659 B2 | 4/2017 |
| JP | 2017-111900 A | 6/2017 |
| JP | 2018-193003 A | 12/2018 |
| JP | 2018-202886 A | 12/2018 |
| WO | WO 2013/042628 A1 | 3/2013 |

* cited by examiner

VEHICLE BATTERY UNIT

CROSS-REFERENCE TO RELATED APPLICATIONS

The present application claims the benefit of priority of Japanese Patent Application No. 2019-093130, filed on May 16, 2019, the content of which is incorporated herein by reference.

TECHNICAL FIELD

The present invention relates to a vehicle battery unit mounted on an electric vehicle or the like.

BACKGROUND ART

JP-A-2018-193003 and JP-A-2018-202886 disclose a battery pack in which a plurality of battery modules are accommodated in a case.

Since the battery module is heavy, reinforcement members are required to mount a plurality of battery modules in the battery case. Further, when a frame member for fixing the battery module is added in addition to the reinforcement member, the number of parts increases and the weight also increases.

SUMMARY

The invention provides a vehicle battery unit which can stably support a battery module while suppressing an increase in the number of parts.

According to an aspect of the invention, there is provided vehicle battery unit including: a battery module; and a battery case configured to accommodate the battery module, wherein: the battery case includes: a case body; and a cover configured to seal an upper opening of the case body; the case body is provided with a front-rear reinforcement member disposed in a bottom portion of the case body and extending in a front-rear direction of a vehicle; and the front-rear reinforcement member includes a first battery support portion which supports the battery module.

According to the invention, since the front-rear reinforcement member for reinforcing the bottom portion of the case body is provided with the first battery support portion for supporting the battery module, the battery module can be stably supported while suppressing an increase in the number of parts.

DESCRIPTION OF EMBODIMENTS

Figure 1:
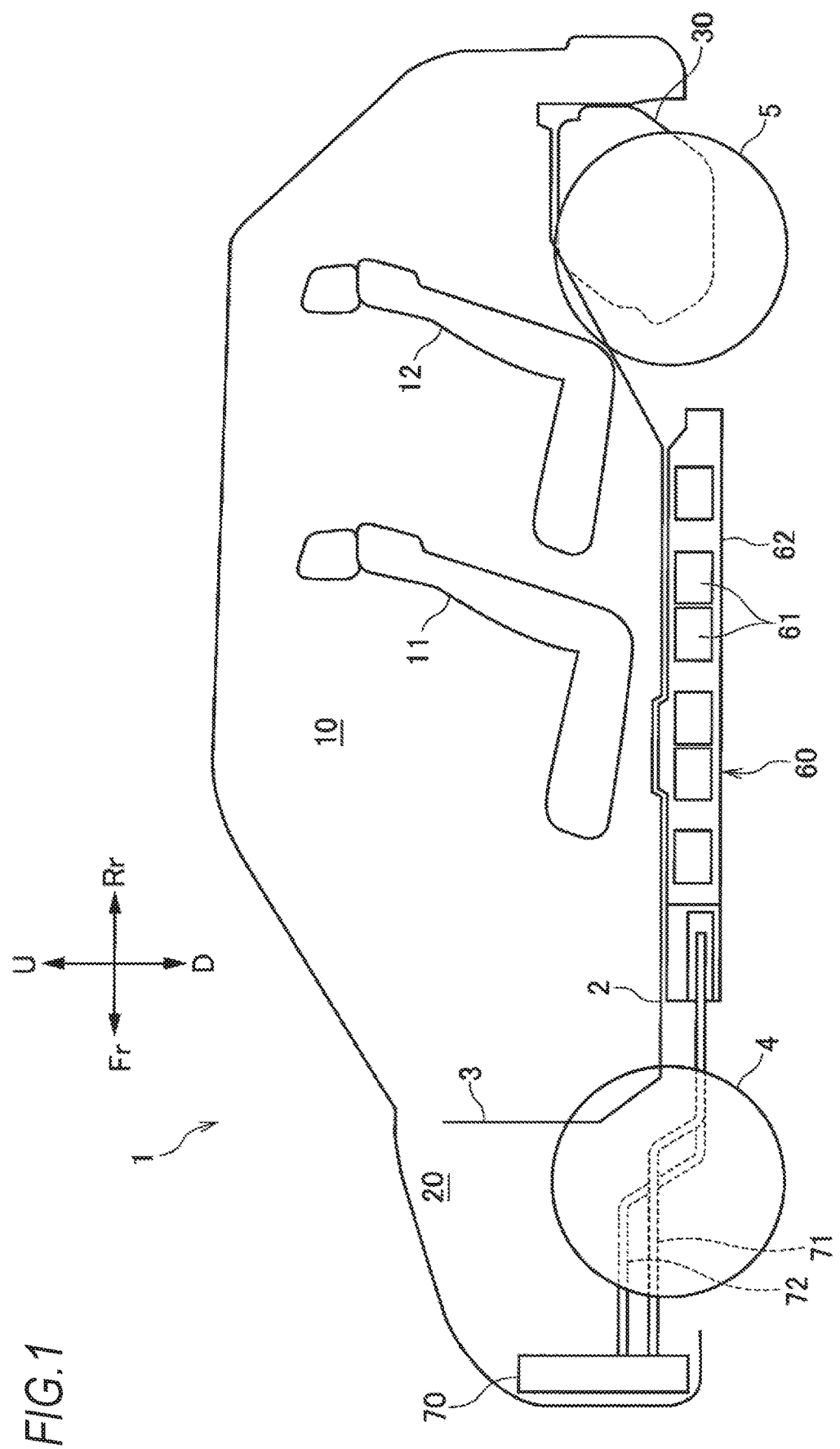
FIG. 1 is a schematic side view illustrating an entire structure of a vehicle on which a vehicle battery unit according to an embodiment of the invention is mounted.

Hereinafter, an embodiment of a vehicle battery unit of the invention will be described with reference to the drawings. In addition, the drawings shall be viewed in the direction of reference letters, and in the following description, front and rear, left and right, up and down are described according to the direction viewed from an operator of a vehicle. In the drawings, the front of the vehicle is indicated by FR, the rear is indicated by Rr, the left side is indicated by L, the right side is indicated by R, the upper side is indicated by U, and the lower side is indicated by D.

Figure 2:
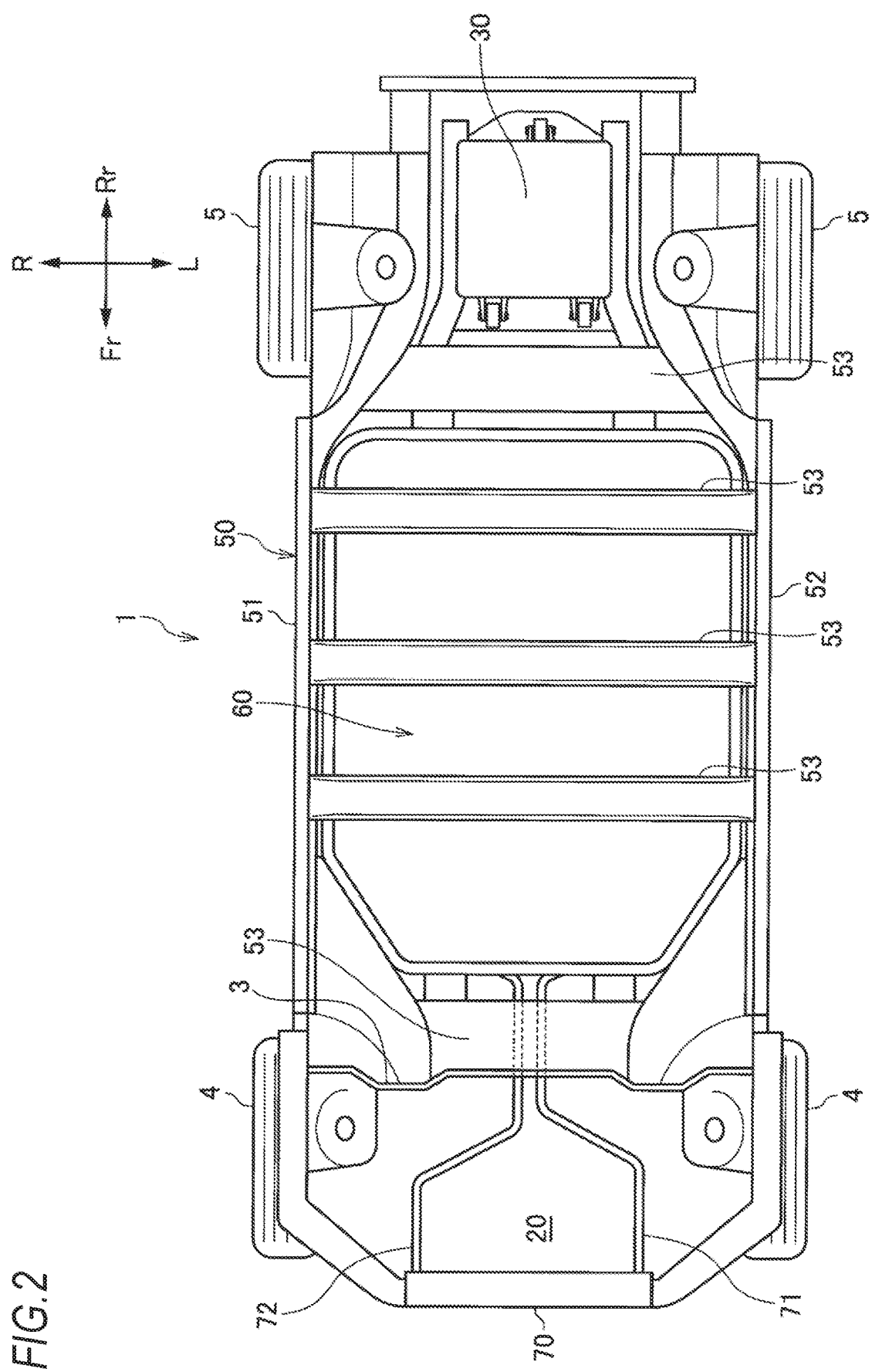
FIG. 2 is a plan view illustrating an underfloor structure of the vehicle in FIG. 1.

As illustrated in FIGS. 1 and 2, a vehicle 1 is defined by a floor panel 2 and a dash panel 3 into a cabin 10 and a front room 20 in front of the cabin 10. The cabin 10 is provided with a front seat 11 and a rear seat 12. A drive device unit 30 is provided below the floor panel 2 behind the rear seat 12. The drive device unit 30 drives left and right rear wheels 5. That is, in the vehicle 1, the left and right rear wheels 5 are used as drive wheels and left and right front wheels 4 are used as driven wheels.

Below the cabin 10, a battery unit 60 is arranged. The battery unit 60 is configured by accommodating a plurality of battery modules 61 in a battery case 62 and is arranged below the floor panel 2 in the cabin 10.

A vehicle body frame 50 includes a pair of left and right side sills 51 and 52 extending in a front-rear direction and a plurality of cross members 53 extending in a left-right direction and connecting the side sills 51 and 52 to each other.

The drive device unit 30 includes an electric motor, a Power Control Unit (PCU) as an electric motor control device which controls the electric motor, and a power transmission mechanism which transmits the power of the electric motor to the rear wheels 5.

In the front room 20, a cooling device 70 for cooling the battery unit 60 and the like is provided. The cooling device 70 includes a radiator provided on the forefront of the vehicle 1. The cooling device 70 and the battery unit 60 are connected via an outer supply pipe 71 and an outer discharge pipe 72. An electric pump (not illustrated) is provided in the outer supply pipe 71 or the outer discharge pipe 72.

Next, a main part of the invention, a certain battery unit 60 and its cooling structure will be described with reference to FIGS. 3 to 5.

The battery unit 60 includes a plurality of battery modules 61, a battery cooling unit 63 for cooling the battery module 61, an electric connection box 64 arranged on the front side of the battery module 61, a supply pipe 65 for introducing a refrigerant from outside the battery case 62 to the battery cooling unit 63, a discharge pipe 66 for discharging the refrigerant from the battery cooling unit 63 to the outside of the battery case 62, and the battery case 62 accommodating the battery module 61, the battery cooling unit 63, the electric connection box 64, the supply pipe 65, and the discharge pipe 66.

The plurality of battery modules 61 are arranged in the battery case 62 in the front-rear direction and the left-right direction. The battery unit 60 of the embodiment includes a total of twelve battery modules 61 arranged six in the front-rear direction and two in the left-right direction. In the following description, the six battery modules 61 located on the left side may be referred to as left battery modules 61L and the six battery modules 61 located on the right side may be referred to as right battery modules 61R.

Figure 11:
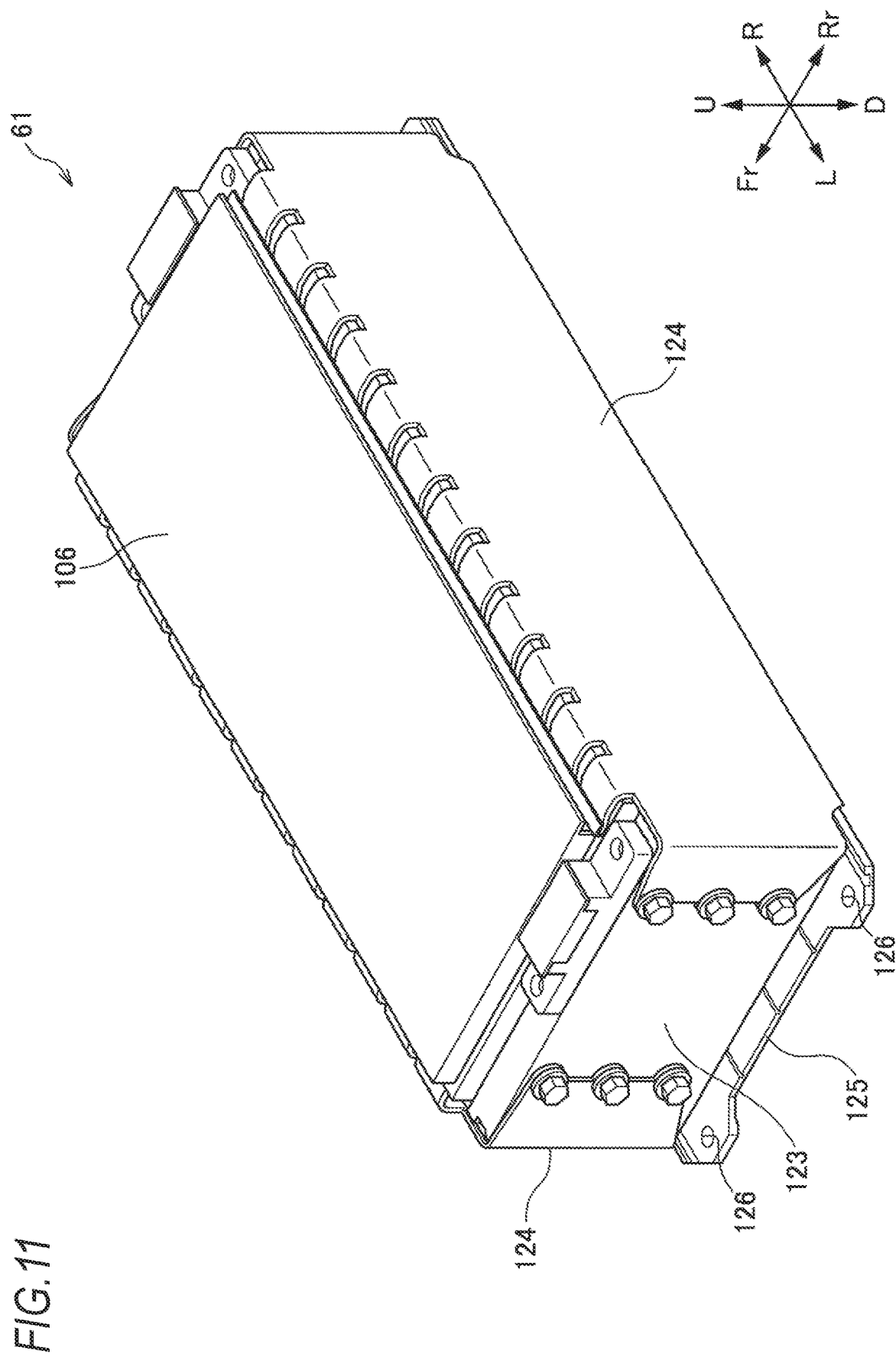
FIG. 11 is a perspective view of a battery module.
Figure 12:
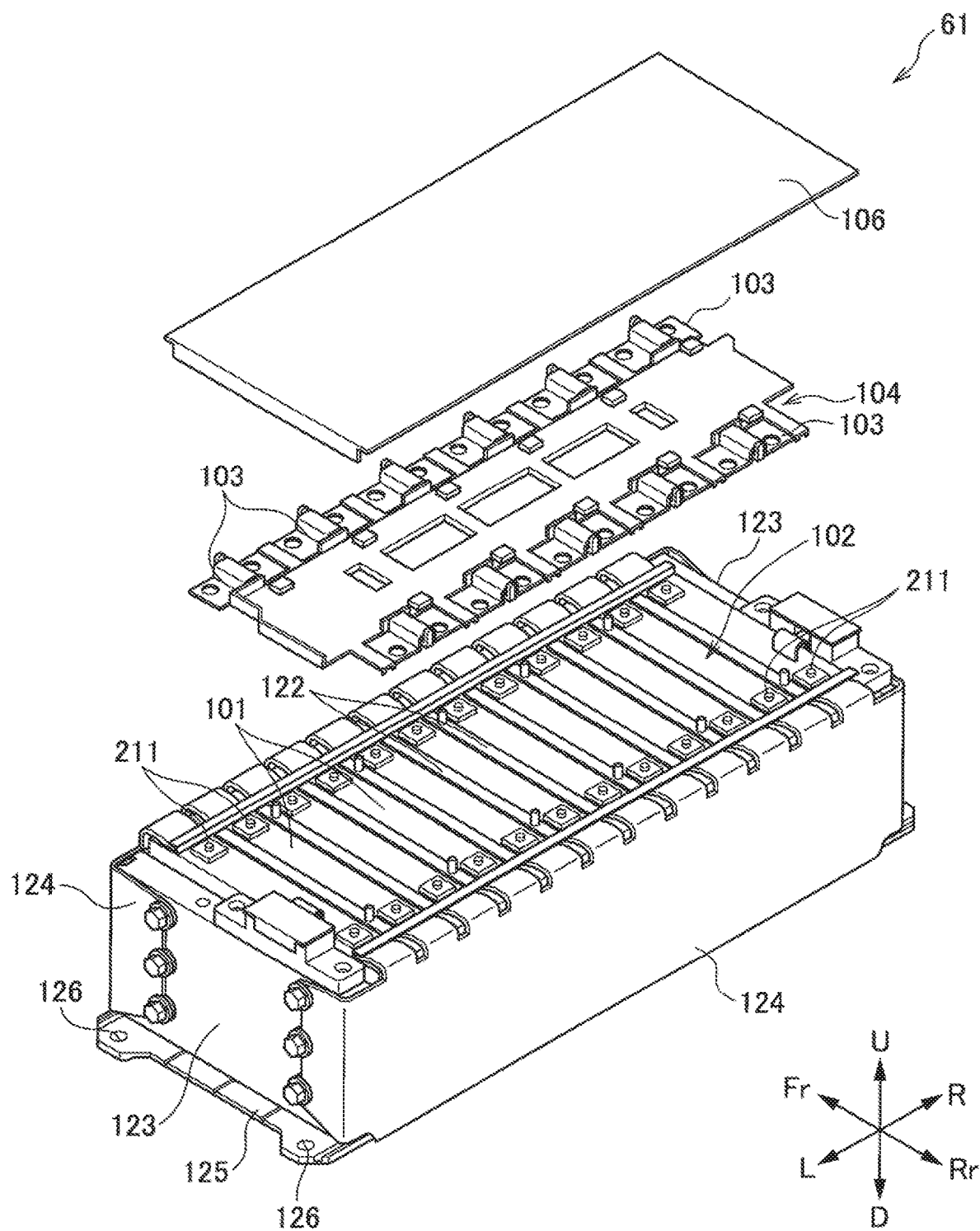
FIG. 12 is an exploded perspective view of the battery module in FIG. 11.

As illustrated in FIGS. 11 and 12, the battery module 61 includes a cell laminate 102 formed by laminating a plurality of cells 101, a plurality of bus bars 103 which electrically connect the cell terminals 211 of the cells 101 arranged on the upper surface side of the cell laminate 102 electrically in series, a bus bar plate 104 for holding the plurality of bus bars 103, and a top cover 106 which is disposed on the upper surface side of the bus bar plate 104 and covers the cell terminals 211 of the cells 101 and the bus bars 103.

The cell laminate 102 is configured by alternately stacking a plurality of cells 101 and a plurality of insulating plates 122 in a laminating direction. The cell laminate 102 includes a pair of end plates 123 arranged at both end portions of the cell laminate 102 in the laminating direction, a pair of side frames 124 connecting the pair of end plates 123, and a lower plate 125 arranged on the lower surface of the cell laminate 102.

Each battery module 61 has a rectangular parallelepiped shape and is arranged so that a longitudinal direction (the laminating direction) is set to be parallel to a left-right direction in plan view and a transverse direction is set to be parallel to a front-rear direction. Further, the battery module 61 is fixed to the battery case 62 by bolts B1 (see FIG. 7) penetrating hole portions 126 provided at four corners of the lower plate 125.

Figure 4:
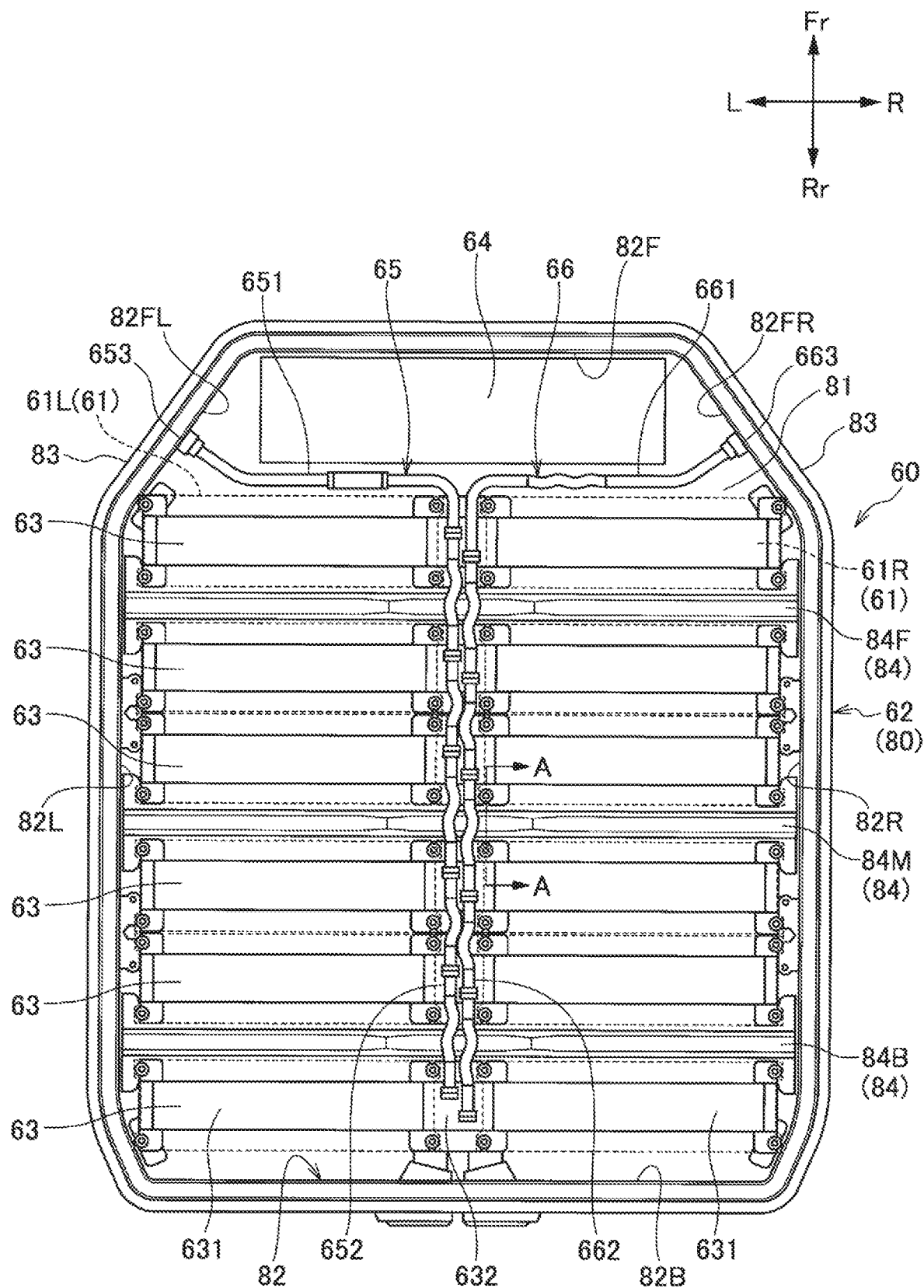
FIG. 4 is a plan view illustrating a cooling structure of the vehicle battery unit in FIG. 1.

As illustrated in FIG. 4, the battery cooling unit 63 is disposed below the battery module 61 and has a refrigerant passage through which the refrigerant passes. In the battery unit 60 of the embodiment, since one battery cooling unit 63 cools two battery modules 61 arranged in the left-right direction, six battery cooling units 63 arranged in the front-rear direction are provided.

The battery cooling unit 63 includes a pair of cooling unit main bodies 631 arranged in a left-right direction and arranged below a pair of battery modules 61 arranged in the left-right direction and a pipe connection portion 632 provided between a pair of cooling unit main bodies 631 arranged in the left-right direction and connected to the supply pipe 65 and the discharge pipe 66. When the refrigerant is supplied from the supply pipe 65 to the pipe connection portion 632, the supplied refrigerant passes through a refrigerant passage formed inside the cooling unit main body 631, and is then discharged from the pipe connection portion 632 to the discharge pipe 66.

The electric connection box 64 accommodates a contact for disconnecting and connecting a conductive path of battery power, a current sensor for detecting a current of the battery power, a ground fault detecting circuit for detecting a ground fault of the battery module 61, and the like. The electric connection box 64 of the embodiment is located on the front side of a pair of battery modules 61 arranged in the front row and arranged in the left-right direction. The left end of the electric connection box 64 is located inside the left end of the left battery module 61L and the right end of the electric connection box 64 is located inside the right end of the right battery module 61R.

Figure 3:
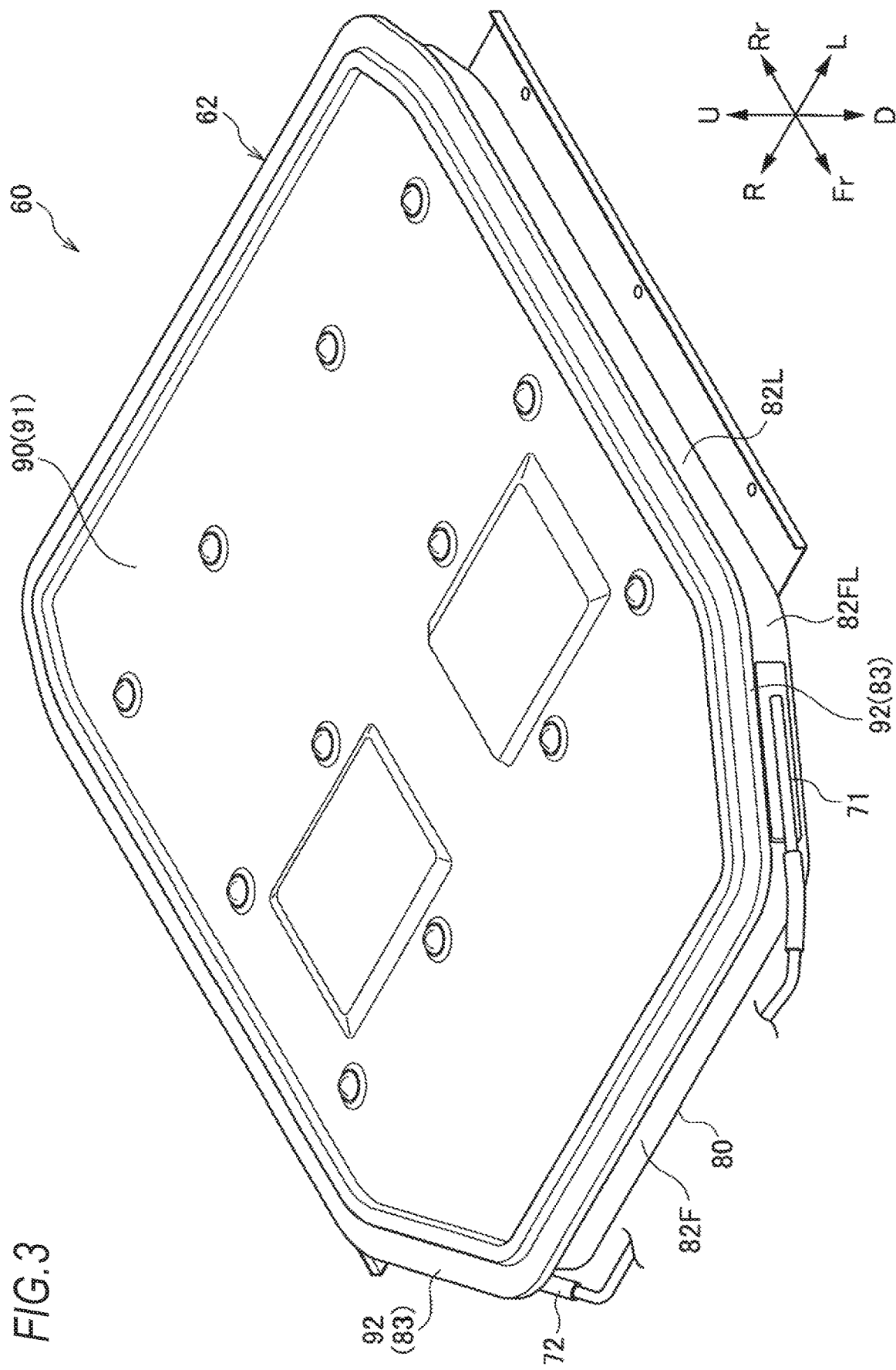
FIG. 3 is a perspective view of the vehicle battery unit in FIG. 1.
Figure 5:
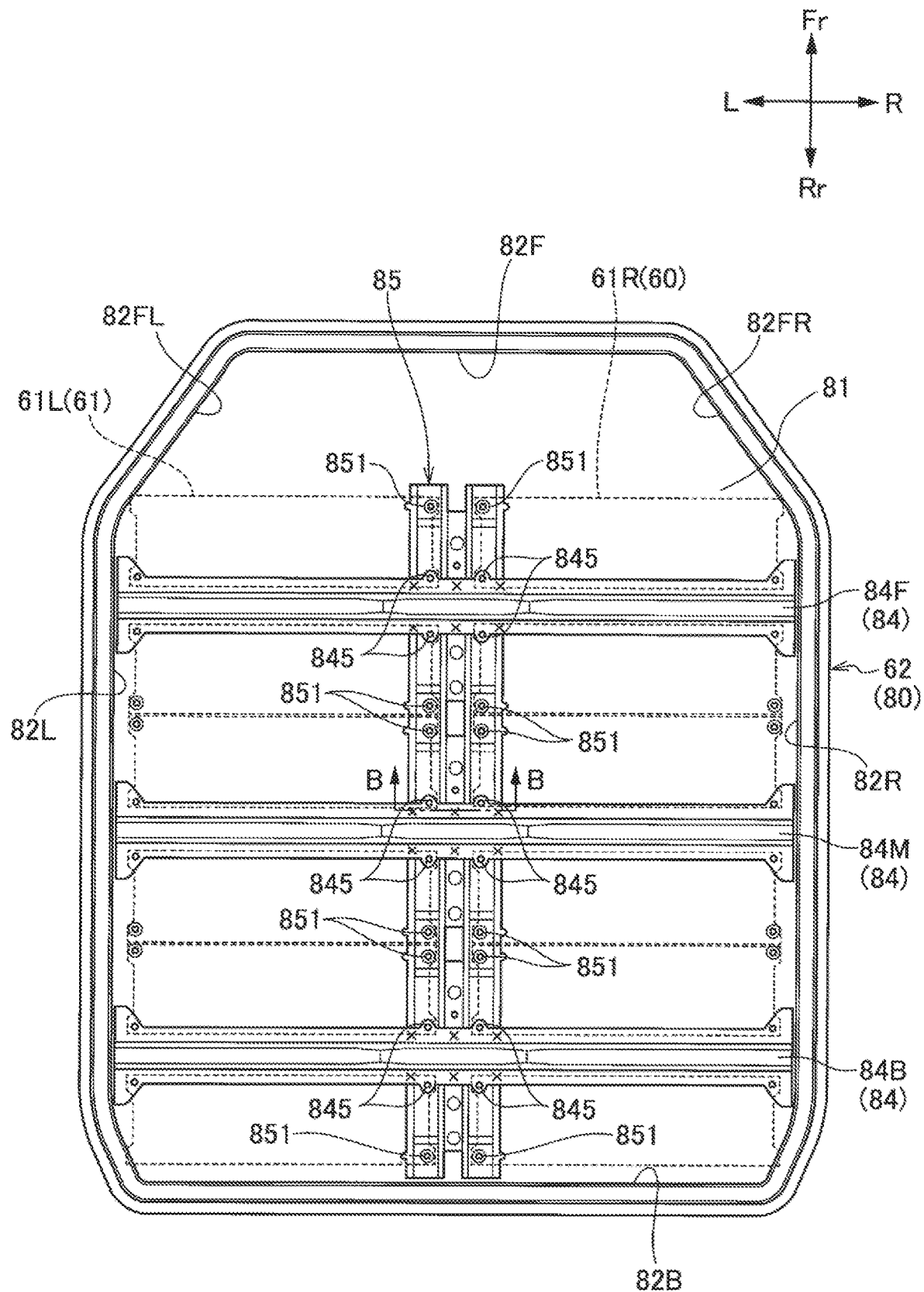
FIG. 5 is a plan view of a case body of the vehicle battery unit in FIG. 1.

As illustrated in FIGS. 3 to 5, the battery case 62 includes a case body 80 accommodating the battery module 61, the battery cooling unit 63, the electric connection box 64, the supply pipe 65, and the discharge pipe 66 and a case lid portion 90 covering an upper opening of the case body 80.

The case body 80 includes a bottom portion 81, a side wall portion 82 rising from an outer edge of the bottom portion 81, and a flange portion 83 extending outward from the upper end of the side wall portion 82. The side wall portion 82 includes a left wall portion 82L and a right wall portion 82R facing each other in the left-right direction, a front wall portion 82F located on the front side of the electric connection box 64, a left inclined wall portion 82FL which connects the front wall portion 82F and the left wall portion 82L, a right inclined wall portion 82FR which connects the front wall portion 82F and the right wall portion 82R, and a rear wall portion 82B which connects rear ends of the left wall portion 82L and the right wall portion 82R. The left inclined wall portion 82FL and the right inclined wall portion 82FR face each other such that the left and right widths are gradually increased as it goes from the front wall portion 82F toward the rear side. The electric connection box 64 is accommodated in a space of which the left and right sides are interposed between the left and right inclined wall portions 82FL and 82FR and the battery module 61 is accommodated in a space of which the left and right sides are interposed between the left and right wall portions 82L and 82R.

In the case body 80, a center frame 85 as a front-rear reinforcement member arranged in the center of the bottom portion 81 in the left-right direction and extending in the front-rear direction and a cross member 84 as a left-right reinforcement member extending in the left-right direction from the left wall portion 82L to the right wall portion 82R are provided.

Figure 7:
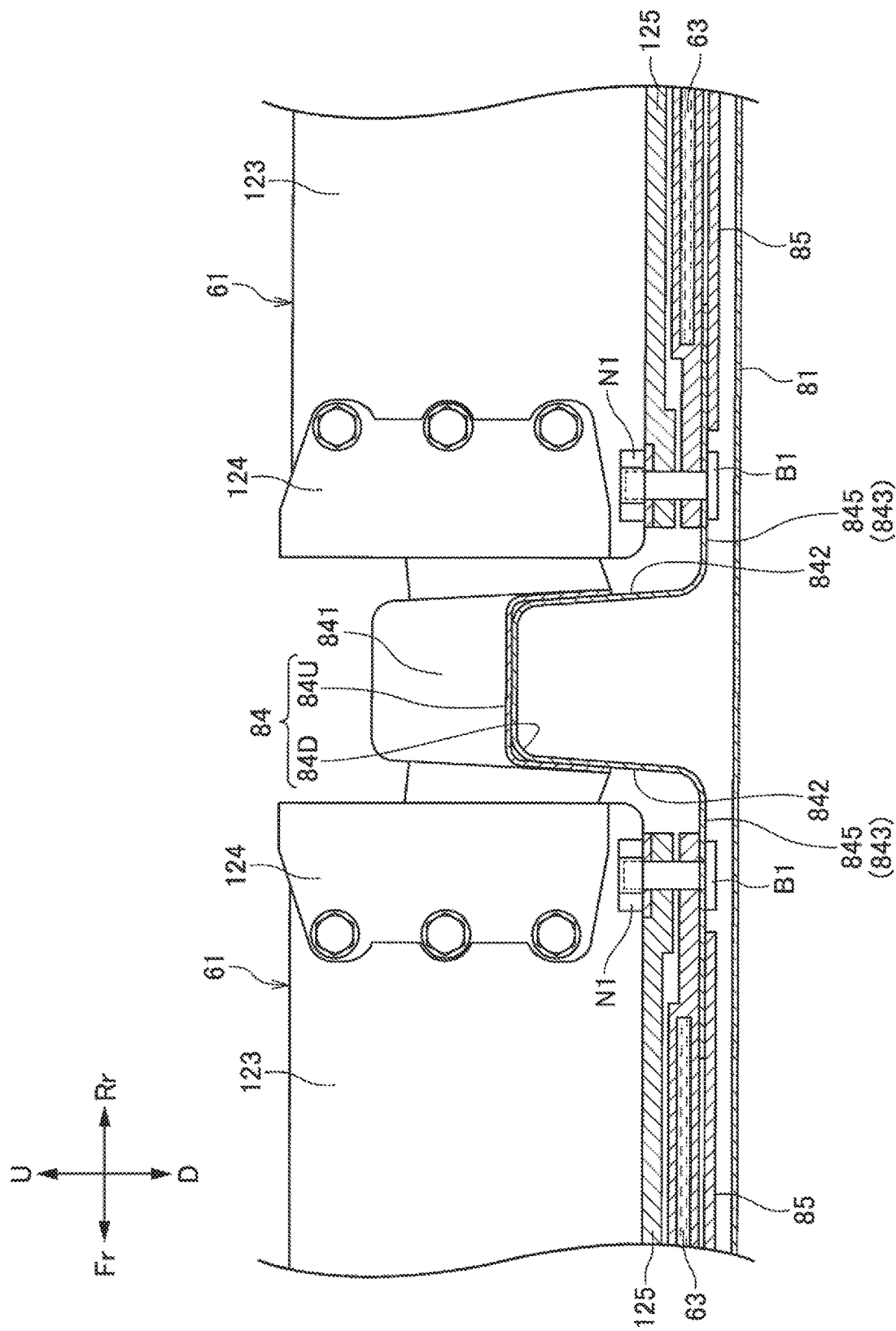
FIG. 7 is a cross-sectional view taken along the line A-A in FIG. 4.

In the embodiment, three cross members 84 are provided apart from each other in the front-rear direction. As illustrated in FIG. 7, the cross member 84 includes an upper surface portion 841, a pair of leg portions 842 extending downward from the upper surface portion 841, and lower surface portions 843 extending from the pair of leg portions 842 along the bottom portion 81 of the case body 80. More specifically, the cross member 84 includes an upper cross member 84U and a lower cross member 84D. The lower cross member 84D has a substantially hat-shaped cross section and the height is substantially constant from the left wall portion 82L to the right wall portion 82R, and further the upper surface is located at a position lower than the center of the battery module 61 in a height direction. The upper cross member 84U has a substantially U-shaped cross section and is fixed to the lower cross member 84D by welding or the like so that the opening side faces downward. The upper cross member 84U has a lower height at the center in the left-right direction and the upper center surface is located at substantially the same position as that of the upper surface of the lower cross member 84D. The upper left surface and the upper right surface of the upper cross member 84U are higher than the upper surface of the lower cross member 84D, higher than the center of the battery module 61 in the height direction, and lower than the upper surface of the battery module 61.

When the three cross members 84 are sequentially referred to as a first cross member 84F, a second cross member 84M, and a third cross member 84B from the front, in the front-rear direction, the electric connection box 64 and the battery module 61 in the front row are arranged between the front wall portion 82F of the case body 80 and the first cross member 84F and the battery modules 61 in the second and third rows are arranged between the first cross member 84F and the second cross member 84M, and further the battery modules 61 in the fourth and fifth rows are arranged between the second cross member 84M and the third cross member 84B, and still further the battery module 61 in the sixth row is arranged between the third cross member 84B and the rear wall portion 82B of the case body 80.

Figure 6:
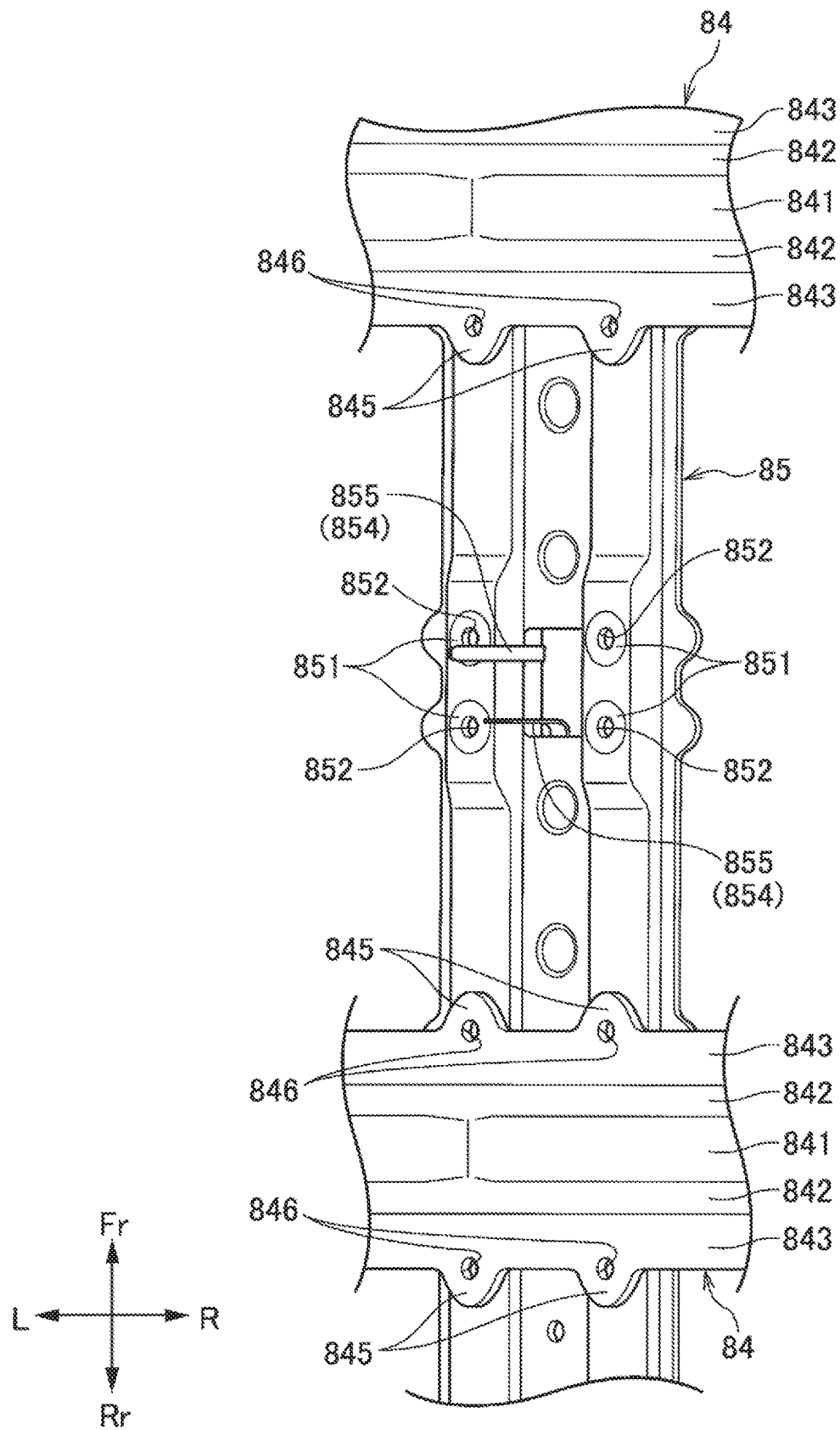
FIG. 6 is a perspective view of a main part of the case body, illustrating a part of FIG. 5 in an enlarged manner.

The center frame 85 is arranged in the bottom portion 81 of the case body 80 and extends in the front-rear direction of the vehicle. The center frame 85 is made of a metal plate. The center frame 85 is provided with first battery support portions 851 which support the battery modules 61 at positions corresponding to left front corners of the right battery modules 61R in the first, third, and fifth rows, positions corresponding to right front corners of the left battery modules 61L in the first, third, and fifth rows, positions corresponding to left rear corners of the right battery modules 61R in the second, fourth, and sixth rows, and positions corresponding to right rear corners of the left battery modules 61L in the second, fourth, and sixth rows. As illustrated in FIG. 6, the first battery support portion 851 is provided with a first through-hole 852 and the bolt B1 is fixed to the back surface thereof.

Further, the three cross members 84 have a central portion in the left-right direction located above the center frame 85. The three cross members 84 are fixed by welding to the center frame 85 and the bottom portion 81 of the case body 80 at a plurality of portions in a portion overlapping the center frame 85, thereby those are integrated. An "x" mark in FIG. 5 indicates a welded portion between the cross member 84, the center frame 85, and the bottom portion 81 of the case body 80.

Figure 8:
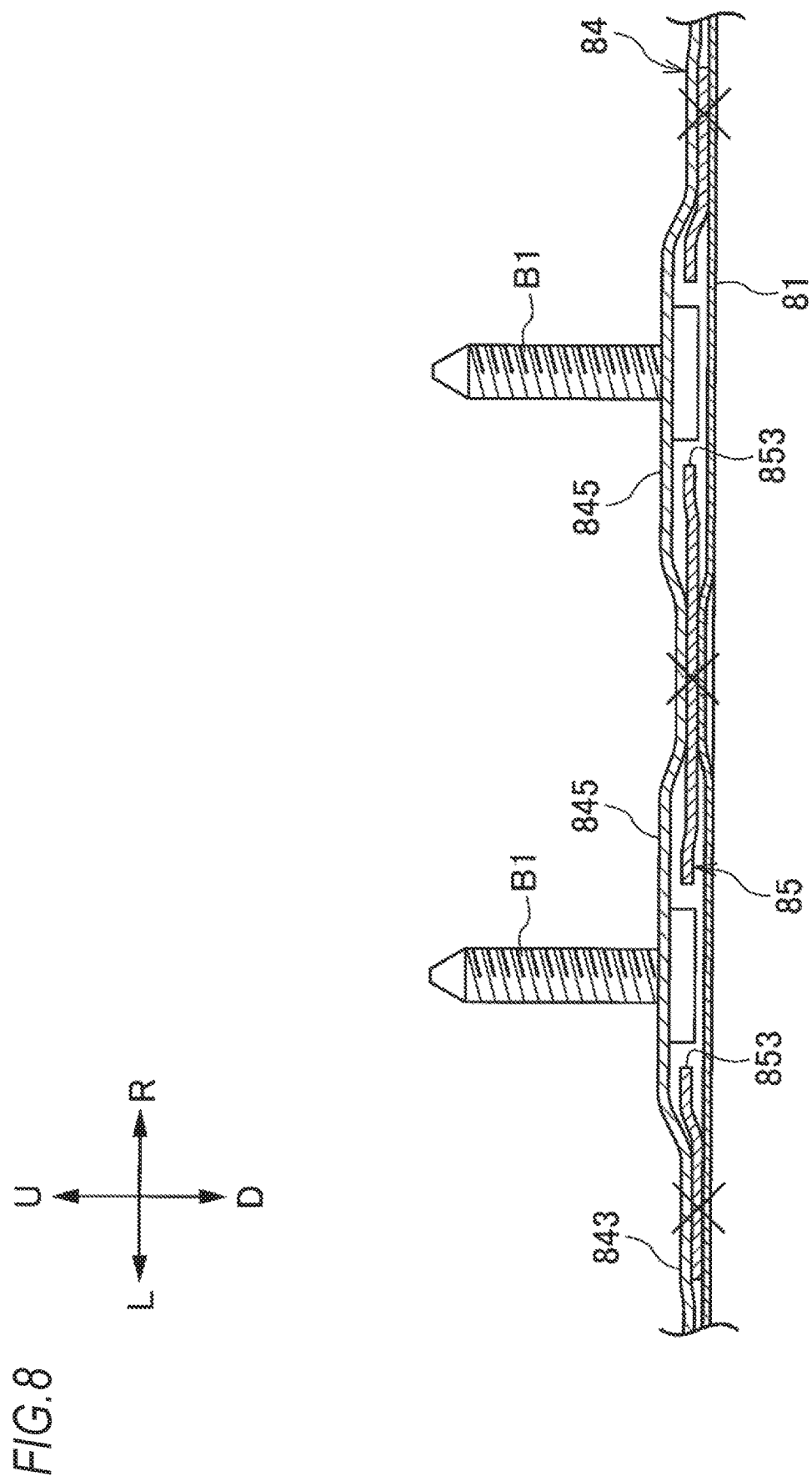
FIG. 8 is a cross-sectional view taken along the line B-B in FIG. 5.

In the lower surface portions 843 of the three cross members 84, second battery support portions 845 which support the battery modules 61 are provided at positions corresponding to the left rear corners of the right battery modules 61R in the first, third, and fifth rows, positions corresponding to the right rear corners of the left battery modules 61L in the first, third, and fifth rows, positions corresponding to the left front corners of the right battery modules 61R in the second, fourth, and sixth rows, and positions corresponding to the right front corners of the left battery modules 61L in the second, fourth, and sixth rows. As illustrated in FIGS. 6 and 7, the second battery support portion 845 is provided with a second through-hole 846 and the bolt B1 is fixed to the back surface thereof. As illustrated in FIG. 8, the center frame 85 is provided with a notch portion 853 which avoids the bolt head of the bolt B1 provided in the second battery support 845. A through-hole may be provided instead of the notch portion 853.

In the first battery support portion 851 and the second battery support portion 845, the battery module 61 is fixed to the battery case 62 by penetrating the bolt B1 protruding upward from the back surface through the hole portion 126 of the lower plate 125 of the battery module 61 and fastening a nut N1 from above. In this way, the first battery support portion 851 which supports the battery module 61 is provided in the center frame 85 which reinforces the bottom portion 81 of the case body 80. Therefore, other support members are not required, and thus the battery module can be stably supported while suppressing an increase in the number of parts. Similarly, since the cross member 84 as a left and right reinforcement member has a second battery support portion 845 which supports the battery module 61, the battery module can be supported stably while suppressing an increase in the number of parts. Also, the center frame 85 is provided with the notch portion 853 or through hole which avoids the bolt head of the bolt B1 provided on the back surface of the second battery support portion 845, the height of the battery module 61 can be suppressed, and thus the size of the battery unit 60 can be reduced.

As illustrated in FIG. 7, the pipe connection portion 632 of the battery cooling unit 63 is fastened to the first battery support portion 851 and the second battery support portion 845. Since the first battery support portion 851 and the second battery support portion 845 which fix the battery module 61 also have the function of fixing the battery cooling unit 63, the member for fixing the battery cooling unit 63 becomes unnecessary, and thus the number of parts can be reduced. Further, relative displacement between the battery module 61 and the battery cooling unit 63 can be prevented.

The case lid portion 90 includes a lid body portion 91 which covers the upper opening of the case body 80 and a flange portion 92 which extends outward from a peripheral edge of the lid body portion 91. The flange portion 92 is overlapped with the flange portion 83 of the case body 80 and fastened via a plurality of bolts.

As illustrated in FIG. 4, the supply pipe 65 includes a first supply pipe portion 651 passing between the electric connection box 64 and the left battery module 61L located in the front row and a second supply pipe portion 652 passing between the left and right battery modules 61. The discharge pipe 66 includes a first discharge pipe portion 661 passing between the electric connection box 64 and the right battery module 61R located in the front row and a second discharge pipe portion 662 passing between the left and right battery modules 61.

Also, an outer pipe connection portion 653 of the supply pipe 65 is joined to the left inclined wall portion 82FL of the battery case 62 and an outer pipe connection portion 663 of the discharge pipe 66 is connected to the right inclined wall portion 82FR of the battery case 62.

The outer pipe connection portion 653 of the supply pipe 65 is arranged outside the battery case 62 and is connected to an outer supply pipe 71 extending along the left inclined wall portion 82FL. The outer pipe connection portion 663 of the discharge pipe 66 is arranged outside the battery case 62 and is connected to an outer discharge pipe 72 extending along the right inclined wall portion 82FR.

Figure 10:
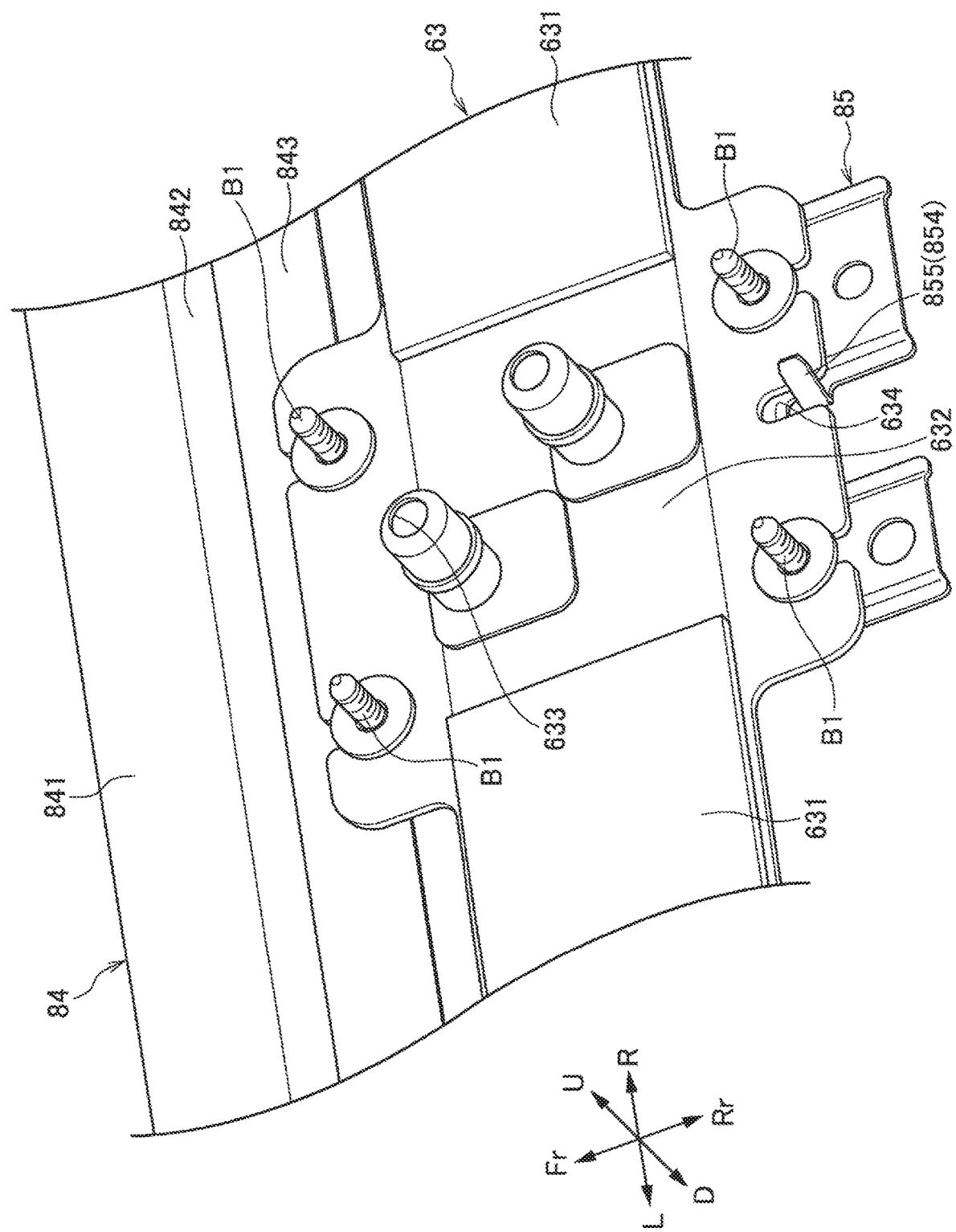
FIG. 10 is an enlarged view of a portion D in FIG. 9 for explaining a misassembly prevention mechanism.

Here, as the battery cooling units 63, three types of battery cooling units 63P, 63Q, and 63R configured so that the supply amount of the refrigerant from the supply pipe 65 to the battery cooling unit 63 is different are used. In the battery cooling units 63P, 63Q, 63R, for example, the diameters of refrigerant supply ports 633 of the pipe connection portions 632 illustrated in FIG. 10 are different. For example, the refrigerant supply port 633 of the battery cooling unit 63P is the smallest and the refrigerant supply port 633 of the battery cooling unit 63R is the largest. Further, the refrigerant supply port 633 of the battery cooling unit 63Q is larger than the refrigerant supply port 633 of the battery cooling unit 63P and smaller than the refrigerant supply port 633 of the battery cooling unit 63R.

Figure 9:
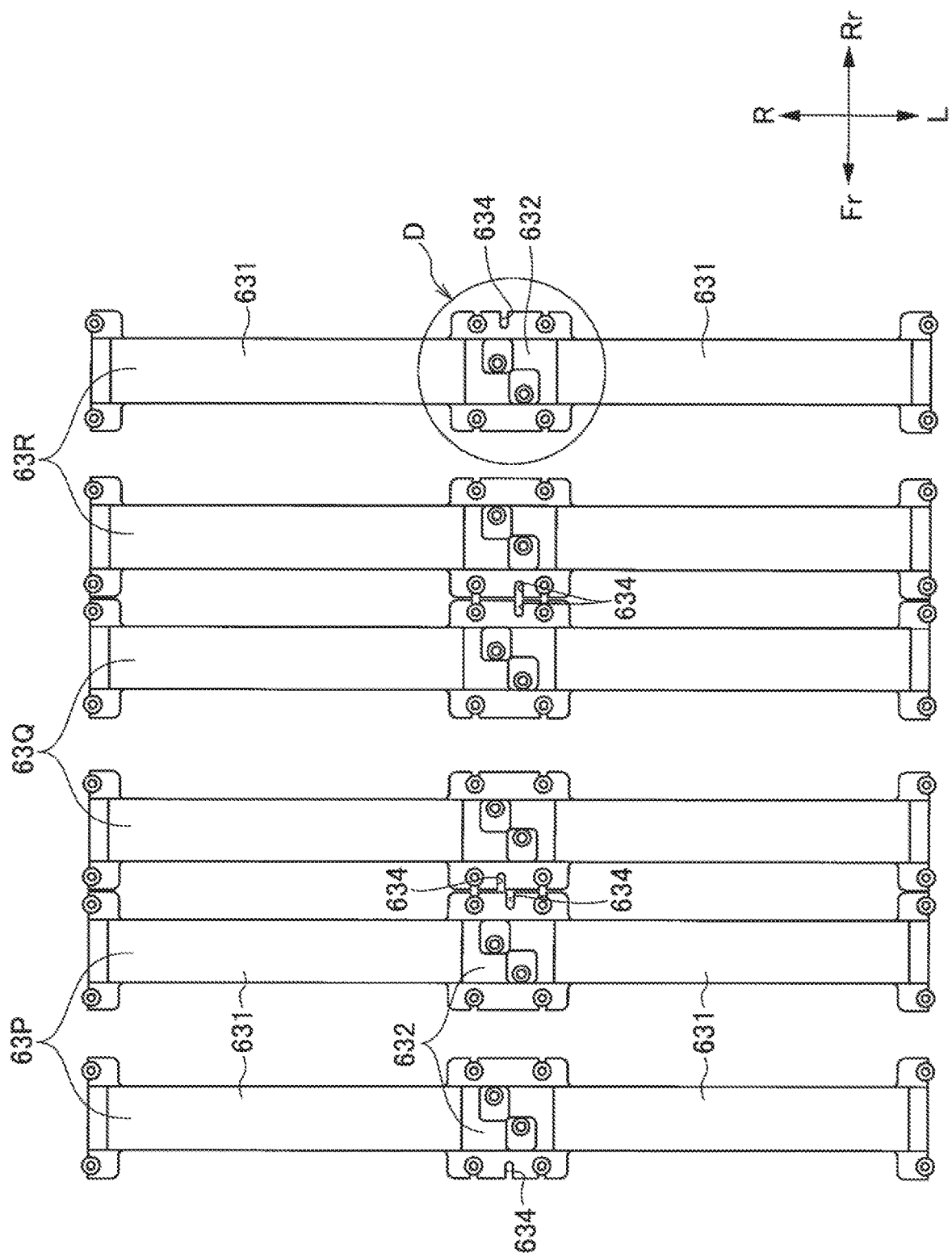
FIG. 9 is a plan view illustrating only a battery cooling unit.

In the battery unit 60, as illustrated in FIG. 9, the battery cooling units 63P are used as the battery cooling units 63 in the first and second rows from the front and the battery cooling units 63Q are used as the battery cooling units 63 in the third and fourth rows, and further the battery cooling units 63R are used as the battery cooling units 63 in the fifth and sixth rows. As described above, in a flow direction of the refrigerant flowing through the supply pipe 65, the refrigerant supply port 633 of the battery cooling unit 63 located on the downstream side has a larger diameter than the refrigerant supply port 633 of the battery cooling unit 63 located on the upstream side, in such a manner that the difference in cooling performance between the upstream side and the downstream side can be reduced.

By using three types of battery cooling units 63P, 63Q, and 63R, it becomes possible to adjust the supply amount of the refrigerant according to the position in the front-rear direction. Further, it is necessary to prevent so-called misassembly which is erroneously performed at the time of assembly.

Therefore, the center frame 85 is provided with a misassembly prevention unit 854 for preventing erroneous assembly of those three types of battery cooling units 63P, 63Q, and 63R. More specifically, as illustrated in FIGS. 6 and 10, the misassembly prevention unit 854 includes a plurality of protrusions 855 provided at different positions in the left-right direction of the center frame 85 and the pipe connection portions 632 of the battery cooling units 63P, 63Q, and 63R are provided with protrusion receiving portions 634 corresponding to the positions of the protrusions 855. The protrusion 855 is formed by bending a part of the center frame 85 and the protrusion receiving portion 634 is formed by cutting out a part of the pipe connection portion 632.

In the embodiment, as illustrated in FIG. 9, In the battery cooling unit 63P of the first row, the protrusion receiving portion 634 is provided at the center of the pipe connection portion 632 in the left-right direction. Further, in the battery cooling unit 63Q of the third row, the protrusion receiving portion 634 is provided to the right side of the pipe connection portion 632, and in the battery cooling unit 63R of the fifth row, the protrusion receiving portion 634 is provided to the left side of the pipe connection portion 632. The battery cooling unit 63P in the second row is obtained by reversing the front-rear direction of the battery cooling unit 63P in the first row and the battery cooling unit 63Q in the fourth row is obtained by reversing the front-rear direction of the battery cooling unit 63Q in the third row, and further the battery cooling unit 63R in the sixth row is obtained by reversing the front-rear direction of the battery cooling unit 63R in the fifth row.

In the center frame 85, the protrusions 855 are provided at the positions corresponding to those protrusion receiving portions 634. Therefore, for example, when the battery cooling unit 63Q or 63R is mistakenly assembled in the first row where the battery cooling unit 63P should be arranged, the protrusion 855 of the center frame 85 interferes with the pipe connection portion 632 of the battery cooling unit 63Q or 63R. As a result, erroneous assembly is prevented. This is the same when the battery cooling unit 63P or 63R is mistakenly assembled in the third or fourth row, and this is also the same when the battery cooling unit 63P or 63Q is mistakenly assembled in the fifth or sixth row. As described above, since the center frame 85 is provided with the misassembly prevention unit 854 for preventing erroneous assembly of the battery cooling unit 63, erroneous assembly of the battery cooling unit 63 is prevented.

The embodiment described above can be appropriately modified, improved, and the like.

For example, in the embodiment described above, it is described that two of the four corners of the lower plate 125 of the battery module 61 are fixed to the first battery support portion 851 and the second battery support portion 845. However, the remaining two corners may be fixed to the lower surface portion 843 of the cross member 84, may be fixed on another reinforcement member, or may be fixed directly to the bottom portion 81 of the case body 80.

At least the following matters are described in this specification. In addition, although the corresponding components in the embodiment described above are shown in parentheses, the invention is not limited to this.

(1) A vehicle battery unit (battery unit 60) which includes a battery module (battery module 61) and a battery case (battery case 62) for accommodating the battery module, where the battery case includes a case body (case body 80) and a cover (case lid portion 90) which seals an upper opening of the case body, the case body is provided with a front-rear reinforcement member (center frame 85) disposed in a bottom portion (bottom portion 81) of the case body and extending in a front-rear direction of a vehicle (vehicle 1), and the front-rear reinforcement member has a first battery support portion (first battery support portion 851) which supports the battery module.

According to (1), since the front-rear reinforcement member for reinforcing the bottom portion of the case body is provided with the first battery support portion for supporting the battery module, the battery module can be stably supported while suppressing an increase in the number of parts.

(2) The vehicle battery unit according to (1), where the case body is provided with a left-right reinforcement member (cross member 84) extending in a vehicle width direction of the vehicle, a part of the left-right reinforcement member is located above the front-rear reinforcement member, and the part of the left-right reinforcement member has a second battery support portion (second battery support portion 845) which supports the battery module.

According to (2), since the left-right reinforcement member for reinforcing the case is provided with the second battery support portion for supporting the battery module, the battery module can be stably supported while suppressing an increase in the number of parts.

(3) The vehicle battery unit according to (2), where the left-right reinforcement member includes an upper surface portion (upper surface portion 841), a pair of leg portions (leg portions 842) extending downward from the upper surface portion, and lower surface portions (lower surface portions 843) extending from the pair of leg portions along the bottom portion of the case body, the second battery support portion is provided in the lower surface portion, a bolt (bolt B1) is fixed on a back of the second battery support portion, and the front-rear reinforcement member is provided with a through-hole or a notch portion (notch portion 853) to avoid a bolt head.

According to (3), since the front-rear reinforcement member is provided with the through-hole or the notch portion to avoid the bolt head provided on the back of the second battery support portion, the height of the battery module can be suppressed. As a result, the size of the battery unit can be reduced.

(4) The vehicle battery unit according to (2) or (3), where the front-rear reinforcement member and the left-right reinforcement member are welded at a plurality of locations.

According to (4), the front-rear reinforcement member and the left-right reinforcement member are welded at the plurality of locations and integrated. As a result, the rigidity of the battery unit is increased.

(5) The vehicle battery unit according to any one of (1) to (4), where a plurality of the battery modules are provided along the front-rear direction, the battery case is provided with a plurality of battery cooling units (battery cooling units 63) along the front-back direction, the plurality of battery cooling units extend above the front-rear reinforcement member in the left-right direction, the plurality of battery cooling units have at least two types, and the front-rear reinforcement member is provided with a misassembly prevention unit (misassembly prevention unit 854) for preventing erroneous assembly of the at least two types of battery cooling units.

According to (5), since there are at least two types of battery cooling units, an appropriate battery cooling unit can be arranged according to the position in the front-rear direction. In addition, since the front-rear reinforcement member is provided with the misassembly prevention unit for preventing erroneous assembly of the battery cooling unit, erroneous assembly of the battery cooling unit is prevented.

(6) The vehicle battery unit according to (5), where the at least two types of battery cooling units are configured so that a supply amount of refrigerant is different.

According to (6), since the battery cooling units are configured so that the supply amount of the refrigerant is different, the supply amount of the refrigerant can be adjusted according to the position in the front-rear direction.

(7) The vehicle battery unit according to (5) or (6), where the at least two types of battery cooling units have different diameters of refrigerant supply ports (refrigerant supply ports 633).

According to (7), since the battery cooling units have the different diameters of the refrigerant supply ports, the supply amount of the refrigerant can be adjusted according to the position in the front-rear direction.

(8) The vehicle battery unit according to (7), where the battery case is provided with, a supply pipe (supply pipe 65) for introducing refrigerant to the plurality of battery cooling units, and a discharge pipe (discharge pipe 66) for discharging the refrigerant from the plurality of battery cooling units, and in a flow direction of the refrigerant flowing through the supply pipe, the diameter of the refrigerant supply port is larger in the battery cooling unit located downstream than in the battery cooling unit located upstream.

According to (8), the diameter of the refrigerant supply port is larger in the battery cooling unit located downstream than in the battery cooling unit located upstream. Therefore, the difference in cooling performance between the upstream side and the downstream side can be reduced.

(9) The vehicle battery unit according any one of (5) to (8), where the misassembly prevention units are a plurality of protrusions (protrusions 855) provided at different positions in the vehicle width direction of the front-rear reinforcement member, and the at least two types of battery cooling units are provided with protrusion receiving portions (protrusion receiving portions 634) corresponding to the positions of the protrusions.

According to (9), the misassembly prevention mechanism can be configured with a simple configuration.

(10) The vehicle battery unit according to (9), where the plurality of protrusions are configured by bending parts of the front-rear reinforcement member.

According to (10), the misassembly prevention unit can be configured without increasing the number of parts.

(11) The vehicle battery unit according to any one of (2) to (4), where a plurality of the battery modules are provided along the front-rear direction, and the battery case is provided with a plurality of battery cooling units (battery cooling units 63) along the front-rear direction, and the plurality of battery cooling units are fixed to at least one of the first battery support portion and the second battery support portion.

According to (11), since the first battery support portion and the second battery support portion for fixing the battery modules also have the function of fixing the battery cooling unit, the member for fixing the battery cooling unit becomes unnecessary, and thus the number of parts can be reduced. In addition, relative displacement between the battery module and the battery cooling unit can be prevented.

The invention claimed is:

1. A vehicle battery unit comprising:
a battery module; and
a battery case configured to accommodate the battery module, wherein:
the battery case includes: a case body; and a cover configured to seal an upper opening of the case body;
the case body is provided with a front-rear reinforcement member disposed in a bottom portion of the case body and extending in a front-rear direction of a vehicle;
the front-rear reinforcement member includes a first battery support portion which supports the battery module;
the case body is provided with a left-right reinforcement member extending in a vehicle width direction of the vehicle;
a part of the left-right reinforcement member is located above the front-rear reinforcement member;
the part of the left-right reinforcement member has a second battery support portion which supports the battery module;
the left-right reinforcement member includes an upper surface portion, a pair of leg portions extending downward from the upper surface portion, and lower surface portions extending from the pair of leg portions along the bottom portion of the case body;
the second battery support portion is provided in the lower surface portion;
a bolt is fixed on a back of the second battery support portion; and
the front-rear reinforcement member is provided with a through-hole or a notch portion to avoid a bolt head.

2. The vehicle battery unit according to claim 1, wherein the front-rear reinforcement member and the left-right reinforcement member are welded at a plurality of locations.

3. The vehicle battery unit according to claim 1, wherein:
a plurality of the battery modules are provided along the front-rear direction;
the battery case is provided with a plurality of battery cooling units along the front-rear direction; and
the plurality of battery cooling units are fixed to at least one of the first battery support portion and the second battery support portion.

4. A vehicle battery unit comprising:
a battery module; and
a battery case configured to accommodate the battery module, wherein:
the battery case includes: a case body; and a cover configured to seal an upper opening of the case body;

the case body is provided with a front-rear reinforcement member disposed in a bottom portion of the case body and extending in a front-rear direction of a vehicle;

the front-rear reinforcement member includes a first battery support portion which supports the battery module;

a plurality of the battery modules are provided along the front-rear direction;

the battery case is provided with a plurality of battery cooling units along the front-back direction;

the plurality of battery cooling units extend above the front-rear reinforcement member in the vehicle width direction of the vehicle;

the plurality of battery cooling units have at least two different configurations of battery cooling units; and the front-rear reinforcement member is provided with a misassembly prevention unit configured to prevent erroneous assembly of the plurality of battery cooling units.

5. The vehicle battery unit according to claim 4, wherein the battery cooling units having different configurations are configured to have different supply amounts of refrigerant.

6. The vehicle battery unit according to claim 4, wherein the battery cooling units having different configurations have different diameters of refrigerant supply ports.

7. The vehicle battery unit according to claim 6, wherein: the battery case is provided with:
   a supply pipe configured to introduce refrigerant to the plurality of battery cooling units; and
   a discharge pipe configured to discharge the refrigerant from the plurality of battery cooling units; and
in a flow direction of the refrigerant flowing through the supply pipe, the diameter of the refrigerant supply port is larger in the battery cooling unit located downstream than in the battery cooling unit located upstream.

8. The vehicle battery unit according claim 4, wherein:
the misassembly prevention units are a plurality of protrusions provided at different positions in the vehicle width direction of the front-rear reinforcement member; and
the plurality of battery cooling units are provided with protrusion receiving portions corresponding to the positions of the protrusions.

9. The vehicle battery unit according to claim 8, wherein the plurality of protrusions are configured by bending parts of the front-rear reinforcement member.

* * * * *